US00RE41349E

(19) United States
(12) Reissued Patent
Piva et al.

(10) Patent Number: US RE41,349 E
(45) Date of Reissued Patent: May 25, 2010

(54) APPARATUS AND METHOD FOR READING AN OPTICAL CODE

(75) Inventors: Marco Piva, Bologna (IT); Maurizio Bianchi, Castel Maggiore (IT)

(73) Assignee: Datalogic S.p.A., Bologna (IT)

(21) Appl. No.: 11/238,067

(22) Filed: Sep. 29, 2005

Related U.S. Patent Documents

Reissue of:
(64) Patent No.: 6,631,846
Issued: Oct. 14, 2003
Appl. No.: 09/922,726
Filed: Aug. 7, 2001

U.S. Applications:
(63) Continuation of application No. 09/320,643, filed on May 27, 1999, now Pat. No. 6,817,525.

(30) Foreign Application Priority Data

Jun. 1, 1998 (EP) ..... 98830336

(51) Int. Cl.
*G06K 7/10* (2006.01)

(52) U.S. Cl. ..... 235/462.43; 235/462.42
(58) Field of Classification Search . 235/462.01 462.45, 235/472.01, 472.02, 472.03, 454, 455
See application file for complete search history.

(56) References Cited

U.S. PATENT DOCUMENTS 4,687,282 A * 8/1987 Ferrante ..... 235/457
4,859,842 A * 8/1989 Suda et al.
5,283,699 A * 2/1994 Komai et al. ..... 235/462.42
5,291,009 A 3/1994 Roustaei
5,308,966 A * 5/1994 Danielson et al. ..... 235/462.23
5,347,121 A * 9/1994 Rudeen
5,349,172 A * 9/1994 Roustaei
5,521,366 A * 5/1996 Wang et al.
5,532,467 A * 7/1996 Roustaei
5,640,001 A * 6/1997 Danielson et al.
5,737,122 A * 4/1998 Wilt et al.
5,756,981 A * 5/1998 Roustaei et al. ..... 235/462.07
5,783,811 A * 7/1998 Fang
5,786,582 A * 7/1998 Roustaei et al.
5,815,200 A * 9/1998 Ju et al.

FOREIGN PATENT DOCUMENTS

WO WO 95 35506 A 12/1995
WO WO 96/13799 * 5/1996
WO WO 97/19416 * 5/1997

* cited by examiner

*Primary Examiner*—Thien M Le
(74) *Attorney, Agent, or Firm*—Sughrue Mion, PLLC

(57) ABSTRACT

The invention relates to an apparatus and a method for reading an optical code. The apparatus having a casing with a reading window; the casing having an illuminator acting through the reading window on an optical code to be read, a detector responsive to light scattered from the illuminated optical code into the casing through the reading window, and an objective lens interposed between the reading window and the detector, in a position to pick up the light scattered from the illuminated optical code and project this light onto the detector. The detector having a plurality of light-sensitive elements effective to convert the light to electric signals representing the light image. The apparatus is characterized in that the illuminator has a first array of light sources active in a first illumination configuration, and at least a second array of light sources active in at least a second illumination configuration different from the first one.

31 Claims, 4 Drawing Sheets

APPARATUS AND METHOD FOR READING AN OPTICAL CODE

Matter enclosed in heavy brackets [ ] appears in the original patent but forms no part of this reissue specification; matter printed in italics indicates the additions made by reissue.

This is a *Reissue Application of U.S. Pat. No. 6,631,846, issued Oct. 14, 2003, which is a* continuation of application Ser. No. 09/320,643 filed May 27, 1999, *now U.S. Pat. No. 6,817,525* the disclosure of which is incorporated herein by reference.

BACKGROUND OF THE INVENTION

This invention relates to an apparatus and a method for reading an optical code. More particularly, the invention relates to an apparatus and a method for reading an optical code within a preset distance range.

As is known, optical codes can be read by means of either stationary or portable reading apparatus. In either cases, the apparatus include a casing with a reading window through which a means of illuminating a code to be read, and a means of reading the image of the code being read by detecting light scattered therefrom and converting it to electric signals, are both arranged to act. The detection means for converting the light signal to an electric signal may be of different types; in general, a so-called CCD (Charge-Coupled Device) is used which comprises an array of a very large number of light-sensitive elements.

Reading apparatus of the above-described type have a drawback in that they can only provide a correct reading of the optical codes within a limited distance range; this restricts substantially their applicability.

A problem to be solved in code reading as effected by a human operator and in automatic object sorting and handling systems, is that of identifying and classifying with a single apparatus objects wherein the distance between the reading apparatus and the optical code can considerably vary. In this situation, the use of an apparatus as above described is disadvantageous, since the apparatus is not always capable of correctly focusing on the object codes to be identificated.

The underlying technical problem of this invention is that of enabling proper reading of optical codes placed at varying distances within a broad range of distances, using an apparatus of simple and low-cost construction.

SUMMARY OF THE INVENTION

Thus, the present invention provides, according to a first aspect thereof, an optical code reading apparatus which comprises:

a casing;

a reading window open into the casing;

an illuminating means, housed within the casing, and arranged to act on an optical code to be read through the reading window;

a detection means, housed within the casing and responsive to light scattered from the illuminated optical code into the casing through the reading window;

an objective lens having an optical axis, the objective lens being housed within the casing between the reading window and the detection means, and being located to pick up light scattered from the illuminated optical code and project the picked-up light onto the detection means, wherein the detection means comprises a plurality of light-sensitive elements capable of converting said light to electric signals representing the light image, characterized in that the illuminating means comprises a first array of light sources which are active in a first illumination configuration, and at least a second array of light sources which are active in at least a second illumination configuration different from the first.

Thus, an apparatus for reading remotely placed optical codes is provided which is capable of reading a code from a fixed position as well as within a broad range of distances.

For this purpose, the apparatus of the invention has a field depth which is considerably greater than that of conventional reading apparatus, and is therefore particularly suitable for reading optical codes within a broad range of distances. The improved field depth is achieved by providing the reading apparatus with a plurality of arrays of light sources which can be selectively activated to define a plurality of different illumination configurations, such that the optical code can be illuminated and focused in an optimum manner at any values of the distance of the code from the reading apparatus.

Advantageously, the first array of light sources comprises a plurality of light source pairs, each pair in turn comprising respective light sources symmetrically arranged with respect to the optical axis of the objective lens and aligned along a substantially perpendicular direction to said optical axis, said light sources lying in a first emission lay intersecting the optical axis and the light-sensitive elements of the detection means. This allows each portion of an optical code being illuminated by the first array of light sources to be projected through the objective lens onto the light-sensitive elements, regardless of the distance between the optical code and the reading apparatus, thereby to detect the light scattered from the code and convert it to electric signals.

Advantageously, the plurality of light source pairs comprises a pair of outward sources disposed in an offset position from the optical axis of the objective lens by an angle $\alpha$, and a pair of inward sources disposed in an offset position from the optical axis of the objective lens by an angle $\beta$, smaller than the angle $\alpha$. Even more advantageously, the angle $\alpha$ is in the range of about 15° to about 18°, and the angle $\beta$ is in the range of about 30 ° to about 6°. In this way, the whole optical code can be suitably illuminated along its extension, even when placed at a considerable distance away from the reading apparatus.

In a specially advantageous embodiment, the apparatus of the invention further comprises a means for confining the light beam from the first array of light sources within a predetermined reading area. Preferably, this means comprises a ring-shaped masking element associated with the casing at the location of the reading window and having a substantially straight inward edge, set at an angle substantially equal to $\alpha$ with respect to the optical axis of the objective lens. As such, a confined light beam can be obtained which has a well defined shape and an extension substantially equal to that of the vision field of the detection means; this contributes to ensuring optimum illumination of the whole optical code at any values of distance between code and reading apparatus, thereby increasing the reading reliability.

The aforementioned advantages are also achieved by the provision, in the reading apparatus, of a holder element for the plurality of light source pairs which is formed with respective seats for said light sources, said seats having respective side walls shaped to confine the light beam from each source within the predetermined reading area. Advantageously, said side walls also function to screen off the detection means, thereby preventing any spurious rays issued from one of the light sources or reflected from a protective glass pane covering the reading window in the casing, from interfering with the scattered light from the code and therefore affecting the reading.

According to one embodiment of the invention, the detection means comprises a linear CCD. In this case, the responsive region of the detection means is represented by a line lying on the aforesaid first emission lay.

Advantageously, the apparatus of the invention further comprises a means for widening the emission angle of the light beam from the first array of light sources along the direction of alignment of said first array of light sources, and narrowing the emission angle of the light beam from the first array of light sources along the perpendicular direction to the first emission lay. Preferably, this means comprises a pair of converging lenses housed within the casing at symmetrical locations with respect to the optical axis of the objective lens between the first array of light sources and the reading window. Thus, these lenses will widen and flatten the light beam from the first array of light sources to give it a comparable shape to that of the responsive region of the detection means, thereby improving the reading reliability.

Advantageously, the second array of light sources comprises a plurality of second light sources having a lower light intensity than the sources in the first array of light sources. These sources are intended for illuminating the optical code when the latter locates closer to the reading apparatus.

Advantageously, the second light sources are housed within the casing symmetrically with respect to the optical axis of the objective lens so as to be aligned to one another in a second emission lay, different from the first one. Preferably, the second emission lay is lower than the first emission lay and the second light sources are housed within the casing centrally with respect to the first array of light sources. The peculiar layout of the second light sources ensures optimum illumination of the code even at near-zero distance of the code from the reading apparatus.

In this case, the light beam issuing from the first array of light sources would have a minimum of light intensity at the central area, because of the gap existing between the two inward light sources in the first array of light sources wherein the objective lens is placed, and a maximum of light intensity at the peripheral areas, thus impairing proper acquisition of the code image. This problem is overcome by activating the second array of light sources; when activated, these light sources will mainly illuminate the above-mentioned central portion, thereby optimizing the overall illumination along the whole optical code.

Preferably, the first array of light sources comprises two pairs of discrete plastics LEDs, and the second array of light sources comprises four SMD plastics LEDs.

The transition from one illumination configuration to the other (and hence activating the light sources in the second array) is effected according to an operational parameter indicating the conditions of the reading operation.

In a first embodiment, the apparatus of this invention comprises a means for measuring the distance of the optical code to be read from the reading apparatus, and a means for activating said first and at least second arrays of light sources according to the distance measured.

Thus, the operational parameter, whereby a decision is made as to whether the illumination configuration should be changed, is the distance between the optical code to be read and the reading apparatus. The reading apparatus preferably comprises a device for measuring the distance (e.g. of the modulated laser light type as disclosed in Patent Application EP-A-0652530 by this Applicant) which is operatively linked to a microprocessor adapted to process the light scattered from the illuminated code to calculate the distance value from the code, so as to select an optimum illumination configuration from a plurality of preset illumination configurations.

In a second embodiment, the apparatus of this invention comprises means for detecting the light intensity outline of the scattered light from the optical code, a means for comparing this outline with a reference outline, and a means for activating said first and at least second arrays of light sources according to the difference between the detected outline and the reference outline. The operational parameter whereby a decision is made as to whether to change the illumination configuration is, therefore, the light intensity outline of the code. The reading apparatus comprises, in particular, an envelope extractor, of a type known, which is operatively linked to a control unit arranged to compare the of light intensity outline scattered from the code with the reference outline, and accordingly select an optimum illumination configuration from a plurality of preset illumination configurations.

In a preferred embodiment, the apparatus of this invention advantageously includes a means of decoding the optical code. Preferably, the apparatus further includes a means of activating said first and at least second arrays of light sources according to the results of decoding attempts. The operational parameter whereby a decision is made as to whether the illumination configuration should be changed is, in this case, the number of unsuccessful decoding attempts made.

Preferably, the means for activating said first and at least second arrays of light sources comprises a microprocessor, the apparatus further including a means of amplifying the electric signals generated by the detection means and means of converting the amplified electric signals to digital signals to be delivered to the microprocessor. In particular, the microprocessor inspect the readings that fail to produce a decoding, class them, and accordingly select an optimum illumination configuration from a plurality of preset illumination configurations.

According to a preferred embodiment, the apparatus of the invention includes a means of varying the amplification level of the electric signals generated by the detection means. In this way, the electric signals generated by the detection means can be digitalized even when they are too weak (such as because generated from a code located on a far surface and/or having low contrast) or too strong (such as because generated from a code located on a near surface and/or having high contrast).

Preferably, the conversion means comprises a main digitalizer having a preset sensitivity and an auxiliary digitalizer whose sensitivity is higher than that of the main digitalizer. Advantageously, the two digitalizers are complementary ones; in fact, the main digitalizer is characterized by low signal distortion and is specially effective to digitalize signals having a wide dynamic range (e.g., for bar codes, signals wherein the difference in voltage level between the bar element and the space element is large), while the auxiliary digitalizer is specially effective to digitalize signals having a dynamic range which may be quite narrow, although with a higher signal distortion. Thus, the electric signals generated by the detection means in the different operative conditions in which the reading is carried out can be correctly digitalized, thereby improving the performance level of the reading apparatus.

According to a second aspect, this invention provides a method of reading an optical code by an apparatus comprising a means of illuminating an optical code to be read and means of detecting light scattered from the illuminated optical code, which method comprises the following steps:

a) illuminating an optical code to be read so as to define a read scan;

b) picking up the light scattered from the illuminated optical code on the detection means;

c) converting the picked-up light to electric signals representing the light image;

characterized in that step a) of illuminating the optical code in turn comprises the following steps:

a1) acquiring an operational parameter indicating specific conditions of the reading operation;

a2) activating, according to the acquired operational parameter, a first array and/or at least a second array of light sources so as to illuminate the code according to respective preset illumination configurations.

The method of the invention advantageously enables an optimum illumination configuration to be selected to suit specific conditions of operation, thereby enhancing the reliability of the reading carried out.

In a first embodiment of the inventive method, step a1) of acquiring the operational parameter comprises a step of measuring the distance of the code to be read from the reading apparatus.

In a second embodiment of the inventive method, step a1) of acquiring the operational parameter comprises the following steps:

detecting a light intensity outline of the scattered light from the optical code;

comparing said outline with a reference outline;

controlling the emissions from the light sources in the first and/or second arrays of light sources according to the difference between the detected outline and the reference outline.

In a specially advantageous embodiment of the method according to the invention, the operational parameter whereby a decision is made as to whether the illumination configuration should be changed is the number of unsuccessful decoding attempts.

BRIEF DESCRIPTION OF THE DRAWINGS

Further features and advantages of this invention will be better understood from the following detailed description of a preferred embodiment thereof, given with reference to the accompanying drawings. In the drawings.

DETAILED DESCRIPTION OF THE INVENTION

Figure 1:
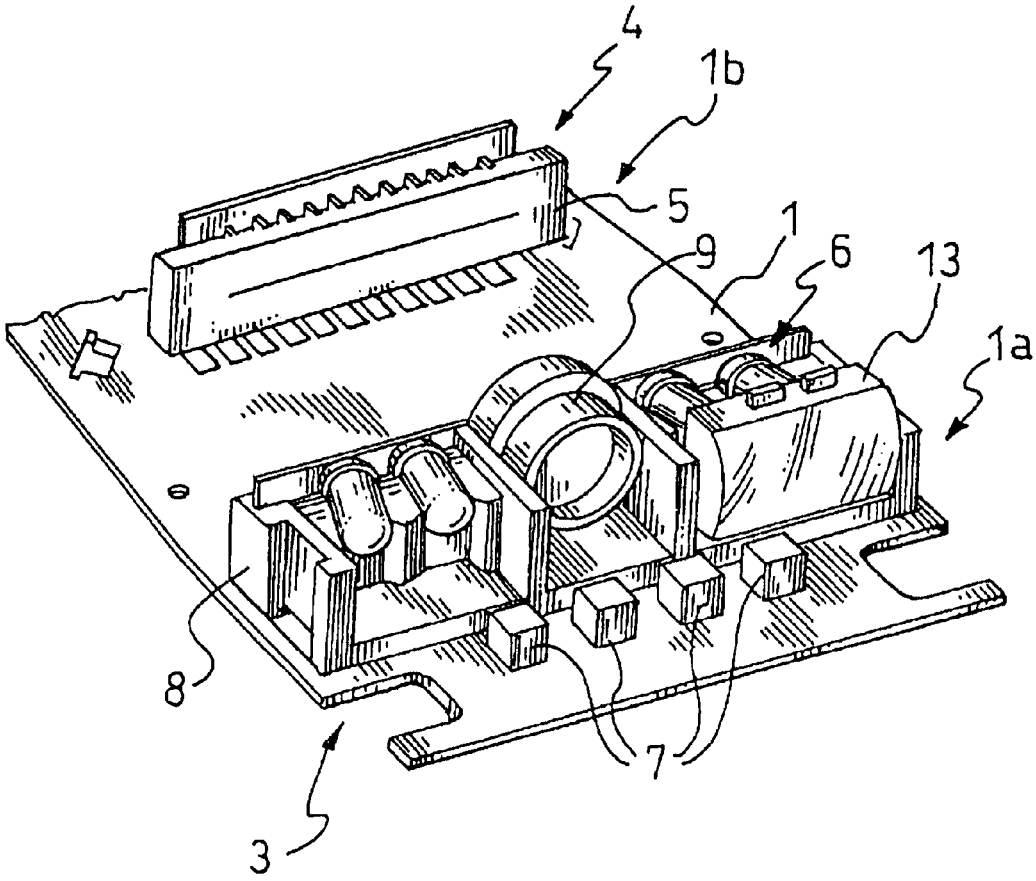
FIG. 1 is a perspective view of an internal card of an optical code reading apparatus according to the invention with the construction elements of the apparatus mounted thereon.
Figure 2:
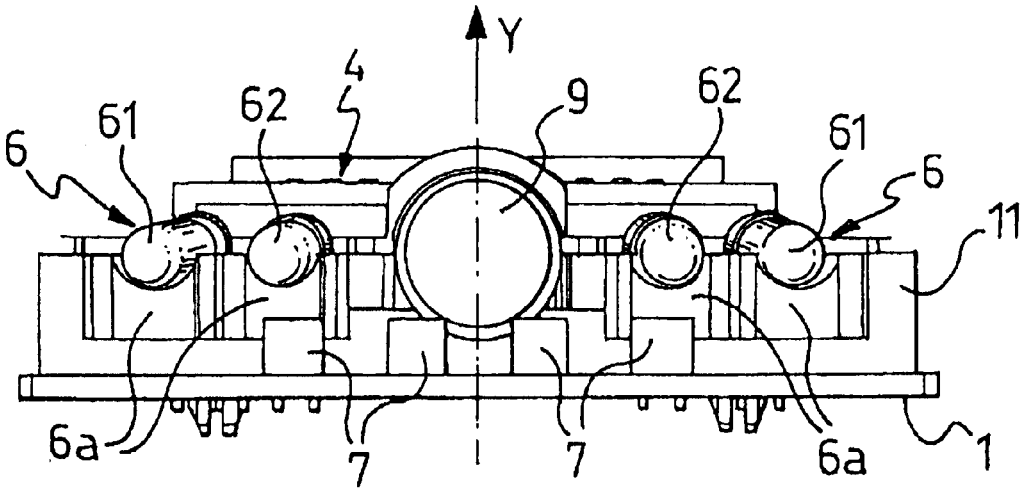
FIG. 2 is a front view of the card shown in FIG. 1.
Figure 3:
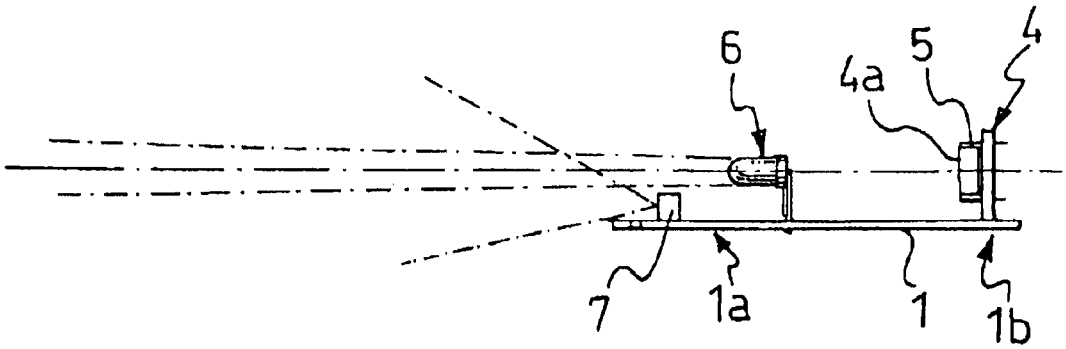
FIG. 3 is a side view of the card shown in FIG. 1.

Shown at 1 in the drawing figures is a holder card intended for installation inside a casing (not shown) of an optical code reading apparatus (not shown). The casing is formed of lower and upper shells which can be conventionally joined together into an enclosure capable of screening off any light rays other than those belonging to the reflected image of the optical code.

Throughout this description and the appended claims, the term "optical code" is used to indicate a code (such as a bar code, a two-dimensional code, or the like) adapted to univocally identify the objects that bear it. In particular, reference will be made herein to bar codes for the sake of clarity.

As shown in FIGS. 1 to 5, the holder card 1 comprises a front portion 1a intended to be facing the optical code to be read, in operation of the reading apparatus, and a back portion 1b. The front portion 1a is provided with an illumination means 3 adapted to illuminate the optical code through a reading window (not shown) which is formed through the reading apparatus casing at the free end of the front portion 1a of the holder card 1. The back portion 1b is provided with a detection means 4 adapted to detect light scattered from the illuminated optical code and passed to the casing interior through the reading window for converting this light to electric signals representing the light image.

Figure 4:
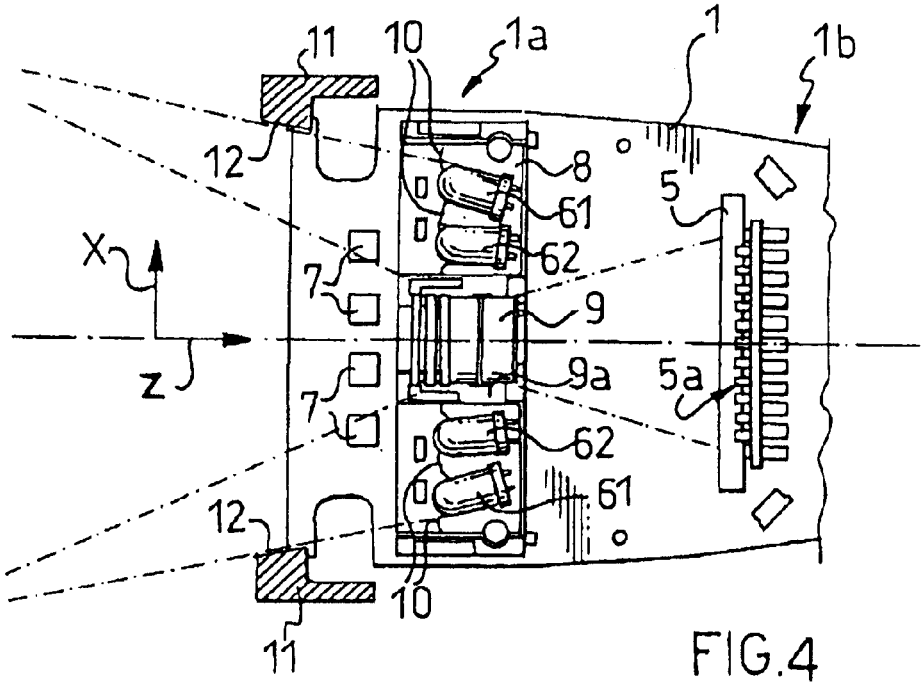
FIG. 4 is a top plan view of the card in FIG. 1, with a ring-shaped masking element associated with one end thereof to confine a light beam within a predetermined reading area.
Figure 5:
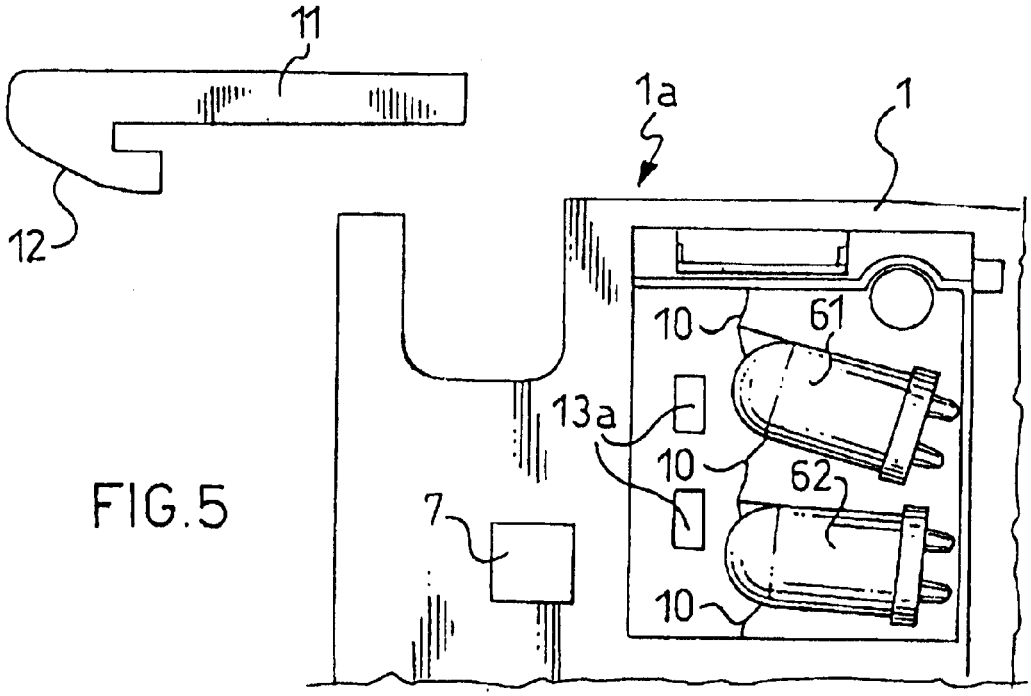
FIG. 5 is an enlarged exploded view of a portion of the card shown in FIG. 4.

Preferably, the detection means 4 comprises a linear type of CCD sensor 5, itself comprising an array formed of a very large plurality of individual light-sensitive elements 5a (FIG. 4). Alternatively, the detection means 4 could comprise matrix or CMOS sensors; in any case, a responsive region 4a to the light scattered from the optical code (which region would be a line where a linear CCD is utilized) is defined on the detection means 4.

The illumination means 3 comprises a first array of light sources 6 (hereinafter also referred to as the main illuminators) and a second array of light sources 7 (the auxiliary illuminators) interposed between the first array of light sources 6 and the reading window. The first array of light sources 6 specifically comprises four discrete plastics LEDs, exhibiting high properties of light intensity and directivity, which have a diameter of about 5 mm and are housed in respective seats 6a formed in a holder element 8 made of a plastics material and mounted on the holder card 1 at the front portion 1a.

The holder element 8 is formed centrally with a seat 9a for receiving an objective lens 9 arranged to pick up light scattered from the illuminated optical code and project this light onto the detection means 4. The objective lens 9 has an optical axis Z which is substantially coincident with a longitudinal centerline of the holder card 1.

The LEDs 6 are positioned on the holder 8 symmetrically with respect to the optical axis Z of the objective lens 9; they are also aligned along a direction X which is perpendicular to said optical axis Z, thereby to define a first emission lay X-Z intersecting the optical axis Z and the responsive region 4a of the light-sensitive elements 5a. In particular, the LEDs 6 comprise a pair of outward LEDs 61 disposed in an offset position from the optical axis Z of the objective lens 9 by an angle $\alpha$ within the range of about 15° to about 18°, and a pair of inward LEDs 62 disposed in an offset position from the optical axis Z of the objective lens 9 by an angle $\beta$ within the range of about 3° to about 60°.

The seats 6a have opposite side walls 10 which are shaped to confine the light beam issuing from each LED 6 within a predetermined reading area. For the same purpose, the reading apparatus of the invention includes a ring-shaped masking element 11, generally made of a rubber, which is associated with the casing, at the front portion 1a of the holder card 1, and provided with a straight inner edge 12, set at an angle with respect to the optical axis Z of the objective lens 9, which is substantially the same as the angle $\alpha$.

The holder element 8 is also provided with a pair of converging lenses 13 received in respective seats 13a formed in the holder element 8, between the seats 6a for the LEDs 6 and the reading window, at symmetrical locations with respect to the optical axis Z; the lenses 13 are designed to reduce the emission angle of the light beam issuing from the LEDs 6 in a direction Y perpendicular to the first emission lay X-Z, and to increase it in the direction X.

The second array of light sources 7 comprises four SMD plastics LEDs of lower light intensity and directivity than the LEDs 6; these LEDs 7 are aligned directly on the holder card 1 at central and symmetrical locations with respect to the optical axis Z of the objective lens 9, and define a second emission lay which is lower than and parallel to the first one.

The reading apparatus of the invention further includes a means of acquiring an operational parameter indicating specific conditions of the reading operation, according to which parameter a microprocessor (not shown) will decide about the light sources to be activated. In a first embodiment, not shown, this means comprises a device for measuring the distance of the code to be read from the reading apparatus (such as that described in Patent Application EP-A-0652530 by this Applicant), being operatively linked to the microprocessor which is to process the light scattered from the illuminated code to calculate the value of the distance to which the code is located and select, through appropriate circuitry, an optimum illumination configuration from a plurality of preset illumination configurations. Examples of optimal illumination configurations versus distance are given in Table 1.

TABLE 1

| DISTANCE (cm) | MAIN ILLUMINATOR | AUXILIARY ILLUMINATOR |
|---|---|---|
| d < 2 | OFF | FULL POWER |
| 2 < d < 4 | OUTER LEDS: FULL POWER<br>INNER LEDS: OFF | FULL POWER |
| 4 < d < 7 | OUTER LEDS: FULL POWER<br>INNER LEDS: MEDIUM POWER | MEDIUM POWER |
| d > 7 | FULL POWER | OFF |

In a second embodiment, not shown, the operational parameter indicating specific conditions of the reading operation is the code light intensity outline; the reading apparatus includes here an envelope extractor, of a type known, which is operatively linked to a microprocessor, itself arranged to compare the outline of light intensity being scattered from the code with a reference outline in order to select an optimum illumination configuration from a plurality of preset illumination configurations. In particular, with the emission angle of each LED being known, the reading area can be divided into n imaginary regions of action, one for each LED; the average level of the code light intensity is detected on each of said regions and compared with a target average level. The microprocessor, based on the n difference values thus obtained and while taking account of the extent that each LED can contribute to also illuminate adjacent regions of action, will then decide as to whether the light intensity contribution of each of them should be increased or decreased by increasing or decreasing the supply current.

In the preferred embodiment of the invention, the reading apparatus includes a means of amplifying the electric signal generated by the detection means 4, means of converting the amplified electric signals to digital signals, and a microprocessor arranged to process the digital signals and attempt to decode the read code (all of which are not shown because conventional). In this embodiment, the operational parameter indicating specific conditions of the reading operation is the number of unsuccessful decoding attempts; thus the microprocessor will, based on this number, decide on which of the LEDs 6 and 7 to activate in order to produce an optimum illumination configuration.

Preferably, the amplifying means is a controlled gain type, that is capable of varying the electric signal amplification level, and the converting means comprises a main digitalizer having a preset sensitivity and an auxiliary digitalizer having a higher sensitivity than the main digitalizer.

The operation of the reading apparatus of this invention will now be described in relation to its preferred embodiment.

The optical code is illuminated to define a first read scan; light scattered from the code is picked up, through the objective lens 9, on the detection means 4 to generate an electric signal representing the light image scattered back from the code. This signal is then amplified and converted to a digital signal by the main digitalizer; the digitalized signal is subsequently supplied to the microprocessor for further processing.

In particular, the microprocessor is arranged to use a control algorithm effective to control the turning on of individual LEDs in the first and second arrays of light sources, such that an optimum illumination configuration can be selected from a plurality of preset illumination configurations to suit specific conditions of operation and, therefore, allow the bar code to be decoded. The algorithm is constructed to take into account the fact that a remote reader is involved having two arrays of light sources and two digitalizers.

To this aim, two preset configuration modes are provided for the two illuminators, and two configuration modes for the two digitalizers. The preset configuration modes for the two illuminators are as follows:

- a primary configuration mode wherein all the LEDs 6 of the main illuminator are supplied with a constant current same as the nominal current, and the LEDs 7 of the auxiliary illuminator are turned off;
- a secondary configuration mode wherein the outward LEDs 61 of the main illuminator are supplied with a constant current which is one half the nominal current, the inward LEDs 62 are turned off, and the LEDs 7 of the auxiliary illuminator are supplied with a constant current same as the nominal current.

In operation, the microprocessor will decide as to whether the first or the second of said configurations modes should be activated, switching from the current one to the other, according to the number of unsuccessful attempts made to decode the code. As for the main and the secondary digitalizers, these are both kept always active, to each time digitalize the same analog signal coming from the amplifying means; however, the microprocessor will only process the output signal from one of them, switching from the current one to the other, according to the number of unsuccessful attempts at decoding the code.

Figure 6:
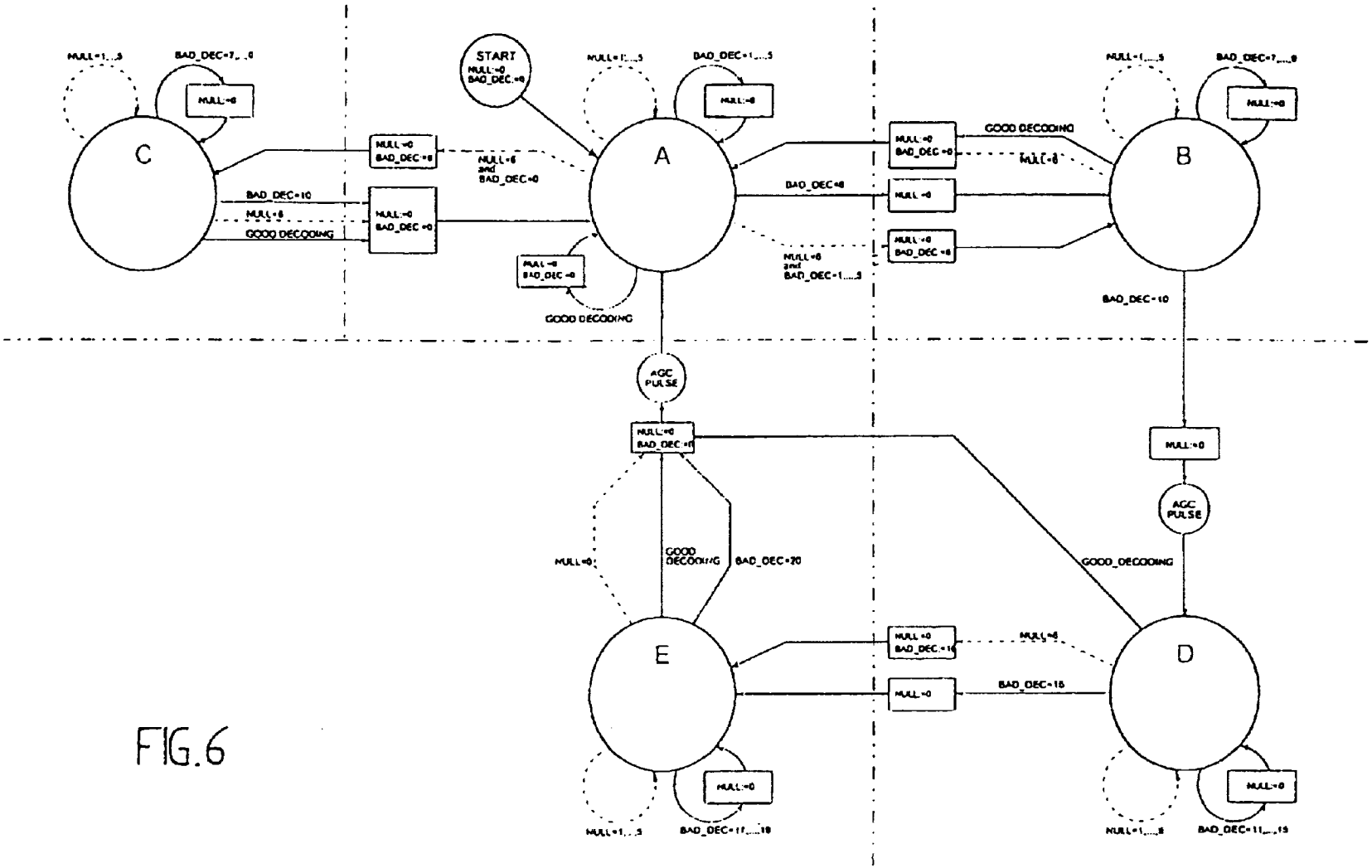
FIG. 6 is a diagram exemplifying the optical code reading method of this invention.

Starting from a default configuration mode denoted by A in the diagram of FIG. 6 (which configuration is considered to represent an optimum for high dynamic range signals and medium-to-long distances), wherein the main digitalizer and the illuminators in the primary configuration mode are used, the control algorithm programmed into the microprocessor will provide a drive strategy for the illuminators and the digitalizers directed to enable the code to be read correctly. In particular, this strategy consists of carrying out two operation cycles, respectively a restricted cycle and a standard cycle. During the restricted operation cycle, the operation is switched from the starting configuration A to a second configuration mode C (regarded to be an optimum for low dynamic range signals and medium-to-long distances), wherein the auxiliary digitalizer and the illuminators in the primary configuration mode are used, and the other way round. During the standard operation cycle, the operation is switched from the starting configuration A to a third configuration mode B, same as the second configuration C, and then to a fourth configuration mode D (regarded to be an optimum for high dynamic range signals and short distances), wherein the main digitalizer and the illuminators in the secondary configuration mode are used, and ultimately to a fifth operation configuration mode E (regarded to be an optimum for low dynamic range signals and short distances), wherein the auxiliary digitalizer and the illuminators in the secondary configuration mode are used. The standard operation cycle is terminated by going back to the starting operation configuration mode A.

The driving strategy for the illuminators and the digitalizers provided by this invention to have an optical code properly read will be discussed next.

The reading step starts from the starting configuration mode A. The optical code is, therefore, illuminated with the LEDs of the first array of light sources 6, and the analog electric signal detected is amplified and converted to a digital signal by the main digitalizer. The digitalized signal is then supplied to the microprocessor which, before attempting to decode, will check if the number of transitions detected on the signal is larger or smaller than a predetermined value K (e.g., eight).

The term "transition" is used in this specification and the appended claims to indicate a switch between two different levels of brightness; for example, a transition would occur from a white element to a black element of a bar code, and vice versa.

The above check is to verify that the processed signal does represent an optical code. In fact, if the number of transitions is found very small, it is judged that the illuminated reading area contains no optical codes so that, rather then a decoding attempt, a new read scan would be made of preference. On the other hand, if the number of transitions exceeds the predetermined value K, it is judged that the illuminated reading area does contain an optical code, and a decoding attempt is made.

In the former instance, the microprocessor would instruct the acquisition of a new scan, iteratively repeating the check for the number of transitions detected on the signal for a predetermined number j of times (e.g., five). If the check gives a negative result consecutively for a predetermined number j of times (and hence, with no decoding attempts being made), the microprocessor instructs a change to the configuration mode C, carrying out the restricted operation cycle. On the other hand, each time that the check for the number of transitions gives a positive result, a decoding attempt is made, and if the attempt is successful, the code decoding is indicated and preparation is made for reading another code; otherwise, the microprocessor instructs a change to the configuration mode B for carrying out the standard operation cycle. A change to the configuration B is also instructed where a total number of decoding attempts greater than a predetermined number p (e.g., six) is made in the configuration mode A.

In the configuration modes C and B, the checking steps for the number of transitions that appear in the scan are repeated iteratively, along with decoding attempts, if any, as described hereinabove.

The choice of the cycle to be performed is dependent on the fact that a switch in illumination configuration involves a glare effect, commonly known as "flashing", which may be objectionable for the user. Accordingly, from the starting configuration A, a decision is made as to whether a restricted cycle or a standard cycle is to be performed on the basis of discriminating data: the occurrence of at least one unsuccessful decoding attempt (an event denoted by the term BAD DECODING) in the starting configuration mode A. The absence of BAD DECODING events would indicate, in fact, that the number of transitions in the acquired signal is insufficient and rules out, with good probability, the existence near the reading apparatus of an optical code which goes undecoded because of insufficient illumination; on the contrary, this is likely to be an indication of a code lying far away and/or having low contrast (a situation of low dynamic range of the signal). Under such conditions, performing the restricted cycle is preferred, thereby avoiding the need to change the illuminator and the flashing effect that goes with it.

It should be noted that the detection of the discriminating data (the occurrence of at least one BAD DECODING event) when deciding on the cycle to be performed, is only effected on the signal from the main digitalizer (configuration A), which is far more reliable than the auxiliary digitalizer. Being more sensitive than the main digitalizer, the auxiliary digitalizer is quicker to detect dummy transitions (i.e., transitions due, for example, to the presence of objects of different colors, or differently illuminated and/or colored, in the field of view of the reading apparatus, rather than to the presence of any bar code).

The choice of switching between digitalizers in advance of the illuminators is dictated by the fact that the reading apparatus of the invention is specifically designed for remote reading, i.e. for reading distant codes. Thus, the missed decoding (BAD DECODING event) is first attributed to an insufficient dynamic range of the signal (as due to the code remoteness and consequent poor illumination, or to low contrast of the print), which is tentatively obviated by the use of a more sensitive digitalizer (the auxiliary digitalizer); in fact, it will be appreciated that in the above-outlined situation, switching to the auxiliary illuminator is of no avail. This change would only be effected where the switching of digitalizers yields unsatisfactory results, it being then justifiable to conclude that the code is in a close-by position. In this case, the main digitalizer is concurrently operated, the assumption being that, with a code in a close-by position, the illumination is sufficient; accordingly, a decoding attempt on a signal which contains the smallest possible amount of distortion (i.e., the signal from the main digitalizer) is to be preferred.

The operation goes back to the starting configuration mode A from configuration C, if alternatively:

a decoding attempt has been successful;

the check for the number of transitions detected in the signal gives a negative result consecutively for a predetermined number j of times without any decoding attempts being made;

the total number of unsuccessful decoding attempts is greater than a predetermined number q (e.g., four).

The operation goes back to the starting configuration mode A from configuration B, if alternatively:

a decoding attempt has been successful;

the check for the number of transitions detected in the signal gives a negative result consecutively for a predetermined number j of times without any decoding attempts being made. On the other hand, if in configuration mode B the total number of unsuccessful decoding attempt exceeds a predetermined number q (e.g., four), then the microprocessor instructs a change to the configuration mode D of operation.

Preferably, the change to the configuration mode D is preceded by a step of varying the signal amplification level (step AGC PULSE in the diagram of FIG. 6). In particular, the microprocessor will effect a sort of amplifier gain reset by suddenly forcing a gain value equal to the maximum allowable value and then allowing it to evolve naturally back to the correct value. This will obviate, on the one side, an inherently slow action of the amplifier when called upon to adjust the gain level upwards, and on the other side, provision of very high gain levels that the amplifier would be unable to attain naturally because they can lead to signal saturation. Such high gain values might provide an adequate amplification of the signal in those instances where it is very low, thereby permitting digitalization.

In the configuration mode D, the steps of checking for the number of transitions in the scan, and any decoding attempts, are repeated iteratively as described above.

From the configuration mode D, the operation goes back to the starting configuration A, when a decoding attempt is successful. If in the configuration mode D the total number of unsuccessful decoding attempts exceeds a predetermined number p (e.g., six), or if the check for the number of transitions detected in the signal gives a negative result consecutively for a predetermined number j of times, without any decoding attempts being made, the microprocessor instructs a change to the configuration mode E.

In the configuration mode E, the steps of checking for the number of transitions in the scan, as well as any decoding attempts, are repeated iteratively as previously described.

From the configuration mode E, the operation finally goes back to the starting configuration A (to begin a new cycle) after carrying out the AGC PULSE step, if alternatively:

a decoding attempt is successful;

the check for the number of transitions detected in the signal gives a negative result consecutively for a predetermined number j of times without any decoding attempts being made; or the total number of unsuccessful decoding attempts is greater than a predetermined number q (e.g., four).

It should be noted that the transitions from configuration A to configuration B, and from D to E, occur after six BAD DECODING events in configurations A and D, respectively, whereas the transitions from B to D, and from E to A, only occur after four BAD DECODING events in B and E, respectively. This will depend on the activation or deactivation of AGC PULSE. The effect of a sudden, artful modification of the gain value of the analog signal amplification stage makes itself felt through two or three scans; in order for the stage to be restored to its normal amplification value, a sufficient number of scans must be completed.

More generally, the numbers of events, K, j, p, q, may not be the same for all of the configuration modes, A, B, C, D, E.; preferably, such number will be individually different for each of said configuration modes.

In the diagram of FIG. 6, the process steps described hereinabove are designated as follows:

NULL: is a variable which is updated each time that a new reading is carried out with no decoding attempts being made (accordingly, a NULL event will occur where the acquired scan contains an insufficient number of transitions for recognition as a bar code);

BAD_DEC: is a variable which is updated each time that a decoding attempt is made (a BAD DECODING event will occur where the attempt is unsuccessful);

GOOD DECODING: is an event that will occur where the decoding attempt is successful;

solid line rectangles represent steps in which values are assigned for NULL and BAD_DEC variables:

solid lines represent switches between configuration modes as brought about by BAD DECODING events;

outlined lines represent switches between configuration modes as brought about by NULL events.

In the method of this invention, the NULL variable is updated each time that a new reading is carried out, each time that a decoding attempt is made (regardless of whether successfully or unsuccessfully), and each time that a configuration switch occurs. The BAD_DEC variable is updated each time that a decoding attempt is made, and is reset each time that the operation goes back to the starting configuration mode A; the value of this variable would be increased before switching from one configuration to another.

What is claimed is:

[1. A reading head for an apparatus for reading an optical code, comprising:

an illuminating means adapted to emit light toward an optical code to be read;

a linear sensor responsive to the light diffused from the illuminated optical code and having a sensitive line extended along a direction X;

an optical apparatus for focusing the diffused light on the linear sensor, said optical apparatus having an optical axis Z which is substantially perpendicular to said sensitive line and defining with said sensitive line a plane X-Z;

wherein said illuminating means generates a fan of light having a plane of symmetry substantially lying on said plane X-Z.]

[2. A reading head according to claim 1, wherein said illuminating means comprises at least one first light source disposed on one side of the optical axis Z of the optical apparatus and at least one second light source disposed on the other side of the optical axis Z of the focusing optical apparatus.]

[3. A reading head according to claim 2, wherein said first and second light sources are symmetrically arranged with respect to the optical axis Z of the focusing optical apparatus.]

[4. A reading head according to claim 2, wherein said illuminating means comprises a plurality of first and second light sources arranged in pairs including a pair of outward sources disposed in an offset position from the optical axis Z of the focusing optical apparatus by an angle $\alpha$, and a pair of inward sources disposed in an offset position from the optical axis Z of the focusing optical apparatus by an angle $\beta$ smaller than the angle $\alpha$.]

[5. A reading head according to claim 4, wherein the angle $\alpha$ is in the range of about 15° to about 18°, and the angle $\beta$ is in the range of about 3° to about 6°.]

[6. A reading head according to claim 4, wherein said illuminating means comprises two pairs of discrete plastics LEDs.]

[7. A reading head according to claim 1, further comprising a means for widening the emission angle of said fan of light in the plane X-Z along the direction X parallel to the sensitive line of the linear sensor, and for narrowing the emission angle of said fan of light along a direction which is perpendicular to the plane X-Z.]

[8. A reading head according to claim 7, wherein the means for widening and narrowing the emission angle of said fan of light comprises at least one converging lens placed downstream said first and second light sources.]

[9. A reading head according to claim 8, wherein the means for widening and narrowing the emission angle of said fan of light comprises a pair of converging lenses placed downstream said first and second light sources at symmetric locations with respect to the optical axis Z of the focusing optical apparatus.]

[10. A reading head according to claim 1, wherein the linear sensor comprises a CCD sensor.]

[11. A reading head according to claim 1, wherein the linear sensor comprises a CMOS sensor.]

[12. A reading head according to claim 1, further comprising a means for confining within a predetermined reading area said fan of light.]

[13. A reading head according to claim 12, wherein said illuminating means comprises a plurality of first and second light sources arranged in pairs including a pair of outward sources disposed in an offset position from the optical axis Z of the focusing optical apparatus by an angle $\alpha$, and a pair of inward sources disposed in an offset position from the optical axis Z of the focusing optical apparatus by an angle $\beta$ smaller than the angle $\alpha$, and wherein the means for confining said fan of light comprises a ring-shaped masking element having a substantially straight inward edge set at an angle substantially equal to $\alpha$ with respect to the optical axis Z of the focusing optical apparatus.]

[14. A reading head according to claim 12, further comprising a holder element for said first and second light sources which is formed with respective seats for said light sources, said seats having respective side walls shaped to confine within said predetermined reading area the light emitted from each source of said plurality of light sources.]

[15. An apparatus for reading an optical code comprising a reading head according to claim 1, further comprising a means for decoding the optical code.]

[16. An apparatus for reading an optical code according to claim 15, further comprising a casing with a reading window adapted to allow emission of said fan of light and collection into the casing of the light diffused from the illuminated optical code.]

[17. An apparatus for reading an optical code according to claim 16, wherein said casing is portable.]

[18. An apparatus for reading an optical code according to claim 16, wherein said casing is stationary.]

[19. A reading head for an apparatus for reading an optical code, comprising:

an illuminating means adapted to emit light toward an optical code to be read;

a linear sensor responsive to the light diffused from the illuminated optical code and having a sensitive line extended along a direction X;

an optical apparatus for focusing the diffused light on the linear sensor, said optical apparatus having an optical axis Z which is substantially perpendicular to said sensitive line and defining with said sensitive line a plane X-Z;

wherein said illuminating means comprises at least one first light source disposed on one side of the optical axis Z of the focusing optical apparatus and at least one second light source disposed on the other side of the optical axis Z of the focusing optical apparatus, said at least one first and second light sources having their axes substantially lying on said plane X-Z.]

[20. A reading head for an apparatus for reading an optical code, comprising:

an illuminating means adapted to emit light toward an optical code to be read;

a linear sensor responsive to the light diffused from the illuminated optical code and having a sensitive line extended along a direction X;

an optical apparatus for focusing the diffused light on the linear sensor, said optical apparatus having an optical axis Z which is substantially perpendicular to said sensitive line and defining with said sensitive line a plane X-Z;

wherein said illuminating means generates a fan of light having a plane of symmetry substantially lying on said plane X-Z, said illuminating means comprising at least one first light source disposed on one side of the optical axis Z of the optical apparatus and at least one second light source disposed on the other side of the optical axis Z of the optical apparatus, and wherein the apparatus further comprises at least one lens placed downstream said first and second light sources for widening the emission angle of said fan of light in the plane X-Z along the direction X parallel to the sensitive line of the linear sensor, and for narrowing the emission angle of said fan of light along a direction which is perpendicular to the plane X-Z.]

[21. A reading head for an apparatus for reading an optical code, comprising:

an illuminating means adapted to emit light toward an optical code to be read;

a linear sensor responsive to the light diffused from the illuminated optical code and having a sensitive line extended along a direction X;

an optical apparatus for focusing the diffused light on the linear sensor, said optical apparatus having an optical axis Z which is substantially perpendicular to said sensitive line and defining with said sensitive line a plane X-Z;

wherein said illuminating means generates a fan of light having a plane of symmetry substantially lying on said plane X-Z, said illuminating means comprising at least one first light source disposed on one side of the optical axis Z of the optical apparatus and at least one second light source disposed on the other side of the optical axis Z of the optical apparatus, and wherein the apparatus further comprises a pair of lenses placed downstream said first and second light sources at symmetric locations with respect to the optical axis Z of the optical apparatus, for widening the emission angle of said fan of light in the plane X-Z along the direction X parallel to the sensitive line of the linear sensor, and for narrowing the emission angle of said fan of light along a direction which is perpendicular to the plane X-Z.]

[22. A reading head for an apparatus for reading an optical code, comprising:

an illuminating means adapted to emit light toward an optical code to be read;

a linear sensor responsive to the light diffused from the illuminated optical code and having a sensitive line extended along a direction X;

an optical apparatus for focusing the diffused light on the linear sensor, said optical apparatus having an optical axis Z which is substantially perpendicular to said sensitive line and defining with said sensitive line a plane X-Z;

wherein said illuminating means generates a fan of light having a plane of symmetry substantially lying on said plane X-Z, said illuminating means comprising at least one first light source disposed on one side of the optical axis Z of the optical apparatus and at least one second light source disposed on the other side of the optical axis Z of the optical apparatus, and wherein the apparatus further comprises a holder element for said first and second light sources which comprises respective seats for supporting said first and second light sources such that said light sources have their axes substantially lying on said plane X-Z.]

[23. A reading head according to claim 22, wherein said illuminating means comprises a plurality of said first and second light sources arranged in pairs, each source included in each of said pairs being disposed in an offset position from the optical axis Z of the optical apparatus by a prefixed angle, and wherein each of said seats is oriented at said prefixed angle.]

[24. A reading head according to claim 23, wherein said pairs of light sources include a pair of outward sources disposed in an offset position from the optical axis Z of the optical apparatus by an angle α, and a pair of inward sources disposed in an offset position from the optical axis Z of the optical apparatus by an angle β smaller than the angle α.]

*25. A reading head for an apparatus for reading an optical code, comprising:*

*illuminating means adapted to emit light toward an optical code to be read;*

*a linear sensor responsive to the light diffused from the illuminated optical code and having a sensitive line extended along a direction X;*

*an optical apparatus for focusing on the linear sensor the light diffused by the illuminated optical code, said optical apparatus having an optical axis Z which is substantially perpendicular to said sensitive line;*

*wherein said illuminating means comprise at least one first light source disposed on one side of the optical axis Z and at least one second light source disposed on the other side of the optical axis Z,;*

*said reading head further comprising a holder element for said at least one first and second light sources, wherein said holder element comprises respective seat elements provided thereon and configured to support said at least one first and second light sources such that each of said at least one first and second light sources has an optical emission axis substantially lying on a plane X-Z defined by said optical axis Z and said sensitive line of the linear sensor.*

*26. A reading head according to claim 25, wherein said seat elements comprise respective first seat portions for supporting said light sources in a fixed position along a direction Y which is perpendicular to said plane X-Z.*

*27. A reading head according to claim 26, wherein said respective first seat portions comprise lower seat portions.*

*28. A reading head according to claim 25, wherein said seat elements comprise respective second seat portions for supporting said light sources in corresponding fixed positions along a direction which is parallel to the sensitive line.*

*29. A reading head according to claim 28, wherein said respective second seat portions comprise opposite lateral seat portions configured to receive said light sources between them.*

*30. A reading head according to claim 28, wherein said respective second seat portions comprise portions of curved surface.*

*31. A reading head according to claim 25, wherein said holder element further comprises a seat for supporting said focusing optical apparatus.*

*32. A reading head according to claim 25, comprising a holder card supporting said holder element.*

*33. A reading head according to claim 25, wherein said at least one first and second light sources are symmetrically arranged with respect to the optical axis Z of the focusing optical apparatus.*

*34. A reading head according to claim 25, wherein said illuminating means generates a light beam having an emission angle and further comprising a means for widening the emission angle of said light beam along a direction parallel to the sensitive line of the linear sensor and for flattening the emission angle of said light beam along a direction Y which is perpendicular to the plane X-Z.*

*35. A reading head according to claim 34, wherein the means for widening and flattening the emission angle of said light beam comprise at least one converging lens placed downstream said at least one first and second light sources.*

*36. A reading head according to claim 34, wherein the means for widening and flattening the emission angle of said light beam comprise a pair of converging lenses placed downstream said at least one first and second light sources at symmetric locations with respect to the optical axis of the focusing optical apparatus.*

*37. A reading head according to claim 34, wherein said holder element further supports said means for widening and flattening the emission angle of said light beam.*

*38. A reading head according to claim 34, wherein said holder element is provided with seats for receiving said means for widening and flattening the emission angle of said light beam.*

*39. A reading head according to claim 25, wherein said at least one first and second light sources are arranged in at least one corresponding pair of light sources, each light source included in said pair of light sources being disposed in an offset position from the optical axis Z of the focusing optical apparatus by a prefixed angle, and wherein each seat of the respective light source comprises a seat portion oriented at said prefixed angle.*

*40. A reading head according to claim 39, wherein said at least one pair of light sources includes a pair of outward sources disposed in an offset position from the optical axis Z of the focusing optical apparatus by an angle α and a pair of inward sources disposed in an offset position from the optical axis Z of the focusing optical apparatus by an angle β smaller than the angle α.*

*41. A reading head according to claim 40, wherein the angle α is in the range of about 15° to about 18° and the angle β is in the range of about 3° to about 6°.*

*42. A reading head according to claim 39, wherein said illuminating means comprise two pairs of discrete plastics LEDs.*

*43. A reading head according to claim 25, wherein the linear sensor comprises a CCD sensor.*

*44. A reading head according to claim 25, wherein the linear sensor comprises a CMOS sensor.*

*45. A reading head according to claim 25, further comprising a means for confining within a predetermined reading area the light emitted by said at least one first and second light sources.*

*46. A reading head according to claim 45, wherein said at least one first and second light sources are arranged in at least one corresponding pair of light sources, said at least one pair of light sources including a pair of outward sources disposed in an offset position from the optical axis Z of the focusing optical apparatus by a prefixed angle α and a pair of inward sources disposed in an offset position from the optical axis Z of the focusing optical apparatus by a prefixed angle β smaller than the angle α, wherein the seat element of a respective light source comprises a seat portion oriented at said prefixed angle, wherein the means for confining the light beam comprises a ring-shaped masking element having a substantially straight inward edge set at an angle substantially equal to α with respect to the optical axis Z of the focusing optical apparatus.*

*47. A reading head according to claim 25, wherein each of said seat elements have respective side walls shaped to confine within a predetermined reading area the light emitted from the respective light source.*

*48. An apparatus for reading an optical code comprising a reading head according to claim 25, further comprising a means for decoding the optical code.*

*49. An apparatus for reading an optical code according to claim 48, further comprising a casing with a reading window adapted to allow emission of the light generated by the illuminating means and collection into the casing of the light diffused from the illuminated optical code.*

*50. An apparatus for reading an optical code according to claim 49, wherein said casing is portable.*

*51. An apparatus for reading an optical code according to claim 49, wherein said casing is stationary.*

*52. A reading head for an apparatus for reading optical codes at variable distances, comprising:*

*an illuminating means adapted to emit light toward an optical code to be read;*

*a linear sensor responsive to the light diffused from the illuminated optical code and having a sensitive line extended along a first direction X;*

*an optical apparatus for focusing on the linear sensor the light diffused by the illuminated optical code, said optical apparatus having an optical axis Z which is substantially perpendicular to said sensitive line and defining with said sensitive line a plane X-Z;*

*said illuminating means comprising at least one first light source disposed on one side of the optical axis Z of the optical apparatus and at least one second light source disposed on the other side of the optical axis Z of the optical apparatus, each of said at least one first and second light sources having an axis corresponding substantially to a maximum of the light intensity distribution of the respective light source, said at least one first and second light sources emitting light while said optical code is being read, each of said light sources being a light emitting diode comprising a body and connecting leads;*

*said reading head further comprising a holder element for housing said focusing optical apparatus and said at least one first and second light sources, wherein said holder element comprises respective seat elements provided thereon for supporting said body of said light sources such that the axes of said light sources substantially lie on said plane X-Z, said seat elements being distinct from said connecting leads.*

*53. A reading head according to claim 52, wherein said seat elements contain at least in part said body of said light sources.*

*54. A reading head according to claim 52, wherein said seat elements are suitably shaped to support said body of said light sources.*

*55. A reading head according to claim 52, wherein said seat elements comprises respective portions for supporting said bodies of said light sources in fixed positions in said plane X-Z, said respective portions comprising lower seat portions for supporting said bodies of said light sources in corresponding fixed positions in said plane X-Z along a direction Y perpendicular to the plane X-Z, and opposite lateral seat portions for housing at least in part said bodies of said light sources between them, said lower and lateral seat portions being suitably shaped to support said bodies of said light sources such that the axes of said light sources substantially lie on said plane X-Z.*

* * * * *